R. A. RENFRO.
SULKY-PLOWS.

No. 194,619. Patented Aug. 28, 1877.

WITNESSES:
E. Wolff.
J. H. Scarborough.

INVENTOR:
R. A. Renfro.
BY
ATTORNEYS.

UNITED STATES PATENT OFFICE.

ROBERSON A. RENFRO, OF ROCKWALL, TEXAS.

IMPROVEMENT IN SULKY-PLOWS.

Specification forming part of Letters Patent No. 194,619, dated August 28, 1877; application filed June 11, 1877.

*To all whom it may concern:*

Figure 1:
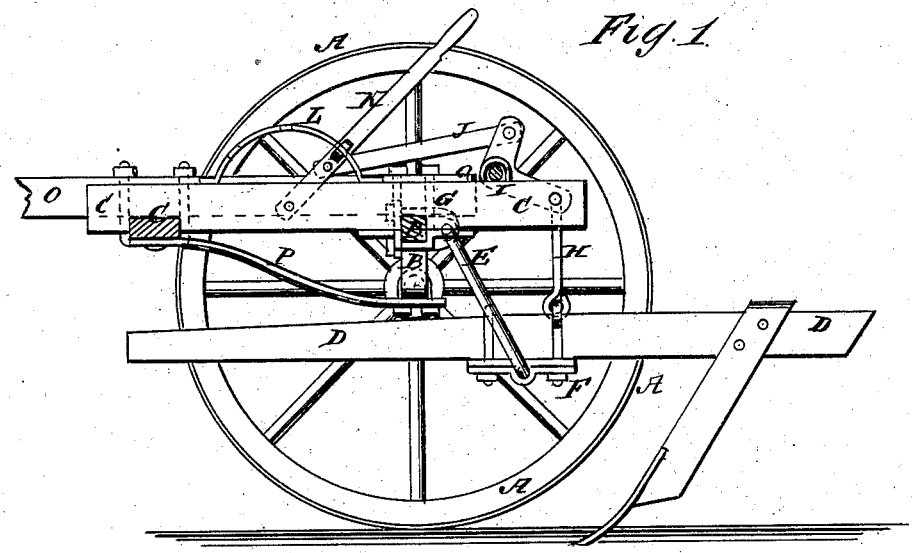
Figure 2:
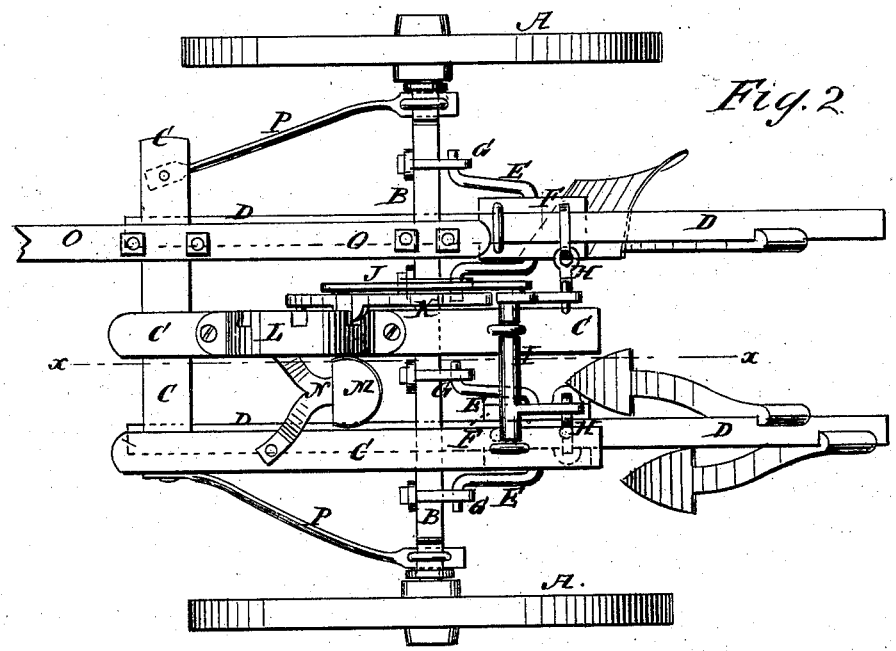
Figure 3:

Be it known that I, ROBERSON A. RENFRO, of Rockwall, in the county of Rockwall and State of Texas, have invented a new and useful Improvement in Sulky-Plow, of which the following is a specification:

Figure 1 is a vertical longitudinal section of my improved sulky-plow, taken through the line $x$ $x$, Fig. 2. Fig. 2 is a top view of the same. Fig. 3 is a detail view of the coupling for connecting the stirrup to the cultivator-beam.

Similar letters of reference indicate corresponding parts.

The object of this invention is to furnish an improved sulky-plow, which shall be simple in construction and convenient in use, and which shall be so constructed that it may be adjusted to run level when used as a breaking-plow, with one wheel in the furrow, and when used as a cultivator with both wheels upon the surface of the ground.

The invention will first be described in connection with the drawing, and then pointed out in the claim.

A are the wheels, which revolve upon the journals of the axle B. The axle B at the inner end of each journal is bent twice at right angles, the right-hand crank thus formed having a drop of six inches, and the left-hand crank having a drop of four inches.

The right-hand wheel A is made four inches more in diameter than the left-hand wheel A, so that the frame of the sulky may be level when the right-hand wheel is running in a furrow four inches deep.

When the machine is to be used as a cultivator, the wheels are exchanged, and the frame will then be level, with both wheels running upon the surface of the ground.

The frame C consists of two or three longitudinal bars, connected at their forward ends by a cross-bar, and secured at a little distance from their rear ends to the axle B.

D are the plow-beams, which may be provided with breaking-plows, as shown by the right-hand beam in Fig. 2, or with cultivating-plows, as shown by the left-hand beam in Fig. 2, according to the kind of plowing required to be done, and one or more plow-beams may be used, as may be desired.

The plow-beams D are connected with the axle B by the stirrups or loops E, the bends of which pass around said beams D, and work in bearings F attached to the under side of said beams by two bolts.

In the case of using cultivator-plows, the rear ends of the bearings should have a curved transverse slot formed in them to receive the rear bolt to give the said plows the necessary lateral play, the forward bolts serving as pivots, as shown in Fig. 3.

The ends of the stirrups or loops E are pivoted and secured to the axle B by clips G, the yokes of which may have holes formed through their ends to receive the ends of the bows, and are secured in place by nuts screwed upon the ends of the said bows, or the said yokes may be made in the form of bolts passed through holes in the ends of the bows, and secured in place by nuts screwed upon their ends. The plow-beams D are adjusted wider apart or closer together by loosening the clips G and moving them upon the axles B.

To the rear part of the beams D are attached the lower ends of short rods or chains H, the upper ends of which are attached to the rearwardly-projecting arms of the shaft I, which works in staples or other bearings attached to the longitudinal bars of the frame C, and to the upwardly-projecting arm of which is pivoted the rear end of the connecting-rod J.

The forward end of the rod J is pivoted to the lever K, the lower end of which is pivoted to the longitudinal bar of the frame C, so that by operating the lever K the plows may be raised from the ground, or adjusted to work at any desired depth in the ground.

The lever K moves along an arched bar, L, which may be notched to receive the lever K, or a projection formed upon said lever, or may have holes formed through it to receive a pin or bolt passing through a hole in the said lever K. The ends of the catch-bar L are attached to a longitudinal bar of the frame C.

M is the driver's seat, the standard N of which is attached to the longitudinal bars of the frame C.

O is the tongue, which is secured to the cross-bar of the frame C, and to the axle B, by U-bolts, so that it may be adjusted according to the number of horses to be used abreast.

The frame C is strengthened against lateral strain by the braces P, the forward ends of which are attached to the ends of the cross-bar of the frame C, and their rear ends are secured to the axle B at the inner ends of its journals. The draft is applied directly to the forward ends of the plow-beams D, and the sulky is pushed forward by the stirrups or loops, which stirrups or loops also act as braces to hold the plows down to their work.

The forward end of the plow-beams should be connected with the sulky-frame in front of the axle, to prevent the forward ends of the plow-beams from dropping too low when the plows are taken out of the ground.

Having thus described my invention, I claim as new and desire to secure by Letters Patent—

The combination, with crank-axle, frame, and beams, of the stirrups E, bearings F, clips G, rods H, armed shaft I, pivoted rod J, and lever K, as and for the purpose specified.

ROBERSON ALLEN RENFRO.

Witnesses:
WM. H. ATHERTON,
W. B. WADE.